US010062295B2

(12) United States Patent
Puvanachandran et al.

(10) Patent No.: US 10,062,295 B2
(45) Date of Patent: Aug. 28, 2018

(54) SYSTEM AND METHOD FOR PERSONALITY-BASED FORMATTING OF INFORMATION

(71) Applicant: Halogen Software Inc., Kanata (CA)

(72) Inventors: Ravi Puvanachandran, Kanata (CA); Ufuk Orhun, Kanata (CA); Graham Brown, Kanata (CA)

(73) Assignee: HALOGEN SOFTWARE INC., Kanata, Ontario (CA)

( * ) Notice: Subject to any disclaimer, the term of this patent is extended or adjusted under 35 U.S.C. 154(b) by 435 days.

(21) Appl. No.: 14/535,061

(22) Filed: Nov. 6, 2014

(65) Prior Publication Data

US 2015/0193400 A1 Jul. 9, 2015

Related U.S. Application Data

(60) Provisional application No. 61/923,445, filed on Jan. 3, 2014.

(51) Int. Cl.
| | | |
|---|---|---|
| *G06F 17/21* | (2006.01) | |
| *G09B 5/00* | (2006.01) | |
| *G06Q 10/00* | (2012.01) | |
| *G09B 7/02* | (2006.01) | |
| *G06F 17/24* | (2006.01) | |
| *G06F 17/22* | (2006.01) | |

(52) U.S. Cl.
CPC ............. *G09B 5/00* (2013.01); *G06F 17/211* (2013.01); *G06F 17/248* (2013.01); *G06Q 10/00* (2013.01); *G09B 7/02* (2013.01)

(58) Field of Classification Search
CPC .................................................. G06F 17/2247
See application file for complete search history.

(56) References Cited

U.S. PATENT DOCUMENTS

| | | | | |
|---|---|---|---|---|
| 5,799,298 | A * | 8/1998 | Bingham | G06F 17/30274 |
| 8,255,237 | B2 * | 8/2012 | Firminger | G06Q 10/06 |
| | | | | 705/1.1 |
| 2007/0106663 | A1 * | 5/2007 | Rosenberg | G06F 17/30716 |
| 2011/0276408 | A1 * | 11/2011 | Toole | G06Q 30/02 |
| | | | | 705/14.66 |
| 2013/0339849 | A1 * | 12/2013 | Mebed | G06Q 10/107 |
| | | | | 715/273 |
| 2014/0317030 | A1 * | 10/2014 | Shen | G06Q 30/01 |
| | | | | 706/12 |
| 2015/0127565 | A1 * | 5/2015 | Chevalier | G06Q 10/00 |
| | | | | 705/319 |

* cited by examiner

*Primary Examiner* — James J Debrow
(74) *Attorney, Agent, or Firm* — Nixon & Vanderhye P.C.

(57) ABSTRACT

Formatting of content for presentation on a display of a computing device is provided. The computing device receives a request to present content associated with a user identifier (ID) of a user of a computing device. Personality attributes associated with the user ID are retrieved defining personality characteristics of the user associated with the user ID. A template is retrieved based on the retrieved personality attributes, the template defining content presentation parameters in respect of the personality attributes. Content is formatted associated with the request using the parameters of retrieved template. The formatted content is presented on the display of the computing device associated with the user ID.

24 Claims, 17 Drawing Sheets

SYSTEM AND METHOD FOR PERSONALITY-BASED FORMATTING OF INFORMATION

CROSS REFERENCE TO RELATED APPLICATIONS

This application claims priority from U.S. Provisional Application No. 61/923,445 filed Jan. 3, 2014 the entirety of which is hereby incorporated by reference for all purposes.

TECHNICAL FIELD

The current application is directed towards personality assessment and in particular to tailoring presentation of content for display on a computing device.

BACKGROUND

Personality tests may be used to identify learning and interaction preferences of a person. When managing employee talent pools, information gleaned from personality tests may be used in forming groups or teams, determining further skills training appropriate for an employee, evaluating employees as well other purposes.

There are a number of different personality tests available, and each represents the personality information in a particular way. Personality tests can provide a wealth of information about employees. However, this personality information has not been utilized to its full potential.

It would be desirable to have additional, alternative and/or improved uses for the personality information.

DETAILED DESCRIPTION

In accordance with an aspect of the present disclosure there is provided a method of formatting content for presentation on a display of a computing device. At the computing device a request is received to present content associated with a user identifier (ID) of a user of a computing device. Personality attributes associated with the user ID defining personality characteristics of the user associated with the user ID are retrieved. A template is retrieved based on the retrieved personality attributes. The template defining content presentation parameters in respect of the personality attributes. Content associated with the request is formatted using the parameters of retrieved template. The formatted content is presented on the display of the computing device associated with the user ID.

In accordance with another aspect of the present disclosure there is provided a non-transitory computer readable memory containing instructions for formatting content for presentation on a display of a computing device. The instructions which when executed by a processor of the computing device receive a request to present content associated with a user identifier (ID) of a user of a computing device. Personality attributes associated with the user ID defining personality characteristics of the user associated with the user ID are retrieved. A template is retrieved based on the retrieved personality attributes. The template defining content presentation parameters in respect of the personality attributes. Content associated with the request is formatted using the parameters of retrieved template. The formatted content is presented on the display of the computing device associated with the user ID.

As described further herein, personality information can be used to format information for presentation to users. Formatting information based on personality information of the user allows the information to be formatted in a way that matches the user's learning characteristics or preferences. For example, a first user may respond best to information presented graphically, while a second user may respond best to the same information when presented textually. Although the information may be the same, the presentation may affect the ease with which the user can process the information, as well as possibly improving the user's comprehension and/or retention of the information.

Formatting information using personality information may be facilitated by providing the personality information in a known format or as common attributes. However, there may be a large number of possible personality tests, with each providing results with different personality types and traits. The personality information may be processed in order to map all of the different personality test results to common personality attributes. The normalized personality attributes can be used to determine an appropriate format to present information to a user.

Figure 1:
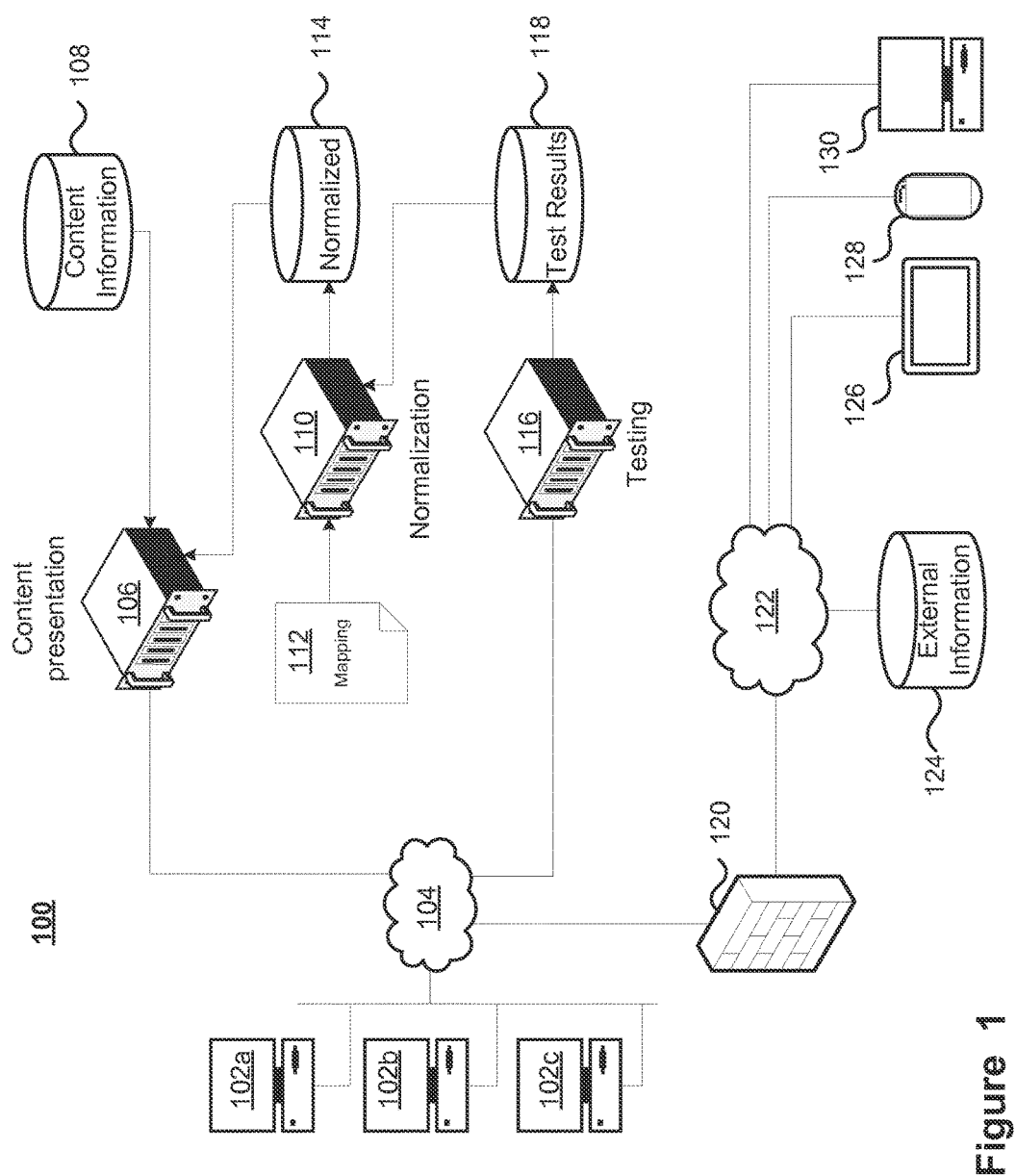
FIG. 1 depicts components of a system for formatting and presenting information based on personality information.

FIG. 1 depicts components of a system for formatting and presenting information based on personality information. The system 100 comprises a number of components networked together. A number of user computers 102*a*, 102*b*, and 102*c* may be used to access information over a network 104. The information may be accessed over a network 104, such as a corporate network. The information may be provided by applications such as enterprise resource planning (ERP) systems, talent management systems, document management systems, personality testing systems or other information management systems. Regardless of the origin of the information, it can be provided by one or more systems, which are depicted collectively as content presentation server 106. The content presentation server retrieves requested information from one or more content information sources depicted as content information database 108, format the information using normalized personality attributes of the user and returns the formatted content to the user's computing device for presentation.

The content presentation server 106 receives an information request from a user, or more particularly, a computing device associated with the user. The information request may include a user ID associated with the user. The content presentation server 106 may use the user ID in order to retrieve normalized personality attributes associated with the user ID from a data store, depicted as normalized database 114 that stores the normalized personality attributes of users. The personality attributes associated with the user ID provide an indication of the personality of the user and can be used to format the requested information in accordance with their personality. That is, the formatting of the information presents the information in a user friendly manner specific to the user. For example, if the user's personality attributes indicate that the user deals best with graphical information, the amount of text presented can be limited and the information presented graphically instead. In addition to presenting the information to a user in an appropriate format based on their personality attributes, the information may be ordered according to the user's personality attributes. For example, if the user's personality attributes indicate that the user focuses best on deadlines, the order of information, such as tasks, can be formatted to show the tasks by their due date, as opposed to by their creation date. The personality attributes may include one or more of, for example:

- a pressure prompted attribute indicative of whether or not a user responds well to the pressure of deadlines;
- a visual attribute indicative of whether the user prefers information to be presented graphically;
- a detailed attribute indicative of whether the user prefers details or summary information, which may be used to adjust the level of detail and explanation presented to the user;
- a logic attribute indicative of the user's preference for logic, which may be used to control the presentation of information, for example presenting more numbers, comparisons, pros/cons, cause/effects;
- a social attribute indicative of a user's interest in social interactions, which may be used to increase importance of personal information, such as hobbies and interest, presented about other users over logistical information, such as department, direct manager, location, work history;
- a verbal attribute may be indicative of a user's preference for verbal communications; and
- a contemporary attribute indicative of a user's preference of contemporary interfaces or modern interfaces.

The normalized personality attributes can be generated by normalization functionality, depicted as normalization server 110. The normalization functionality can retrieve results from personality tests the user has taken and map the personality test results of different tests to the common personality attributes used in formatting the information. The normalization functionality uses mapping information, depicted as a mapping file 112, in order to map the test results to the normalized personality attributes.

The test results used by the normalization server 110 may be retrieved from a store of personality test results, depicted as test results database 118. Personality testing functionality, depicted as testing server 116, may be used to administer various personality tests to users. Additionally or alternatively, the test results may be input manually from previously administered tests. Further, the test results may be received from other online testing systems.

The corporate systems, including the content presentation system 106 may be accessed from the network 104, or from an external network 122. A firewall 120 may be used to secure the internal network 104. The network 122 may connect the above described systems to additional components, including for example, an external information source which may provide information to the content presentation system or other components. Additionally, the network 122 may allow computing devices to connect to the system components, including the content presentation system, while away from the network 104. For example, a user may access the content presentation system using computing devices such as but not limited to a tablet 126, smart phone 128 or personal computer 130 and or device having a screen for presentation of content that requires user interaction. While multiple servers are described, all or some of the portion of the content presentation system 106, normalization server 110 and testing server 116 may be hosted on the same server or system or distributed between systems.

Figure 2:
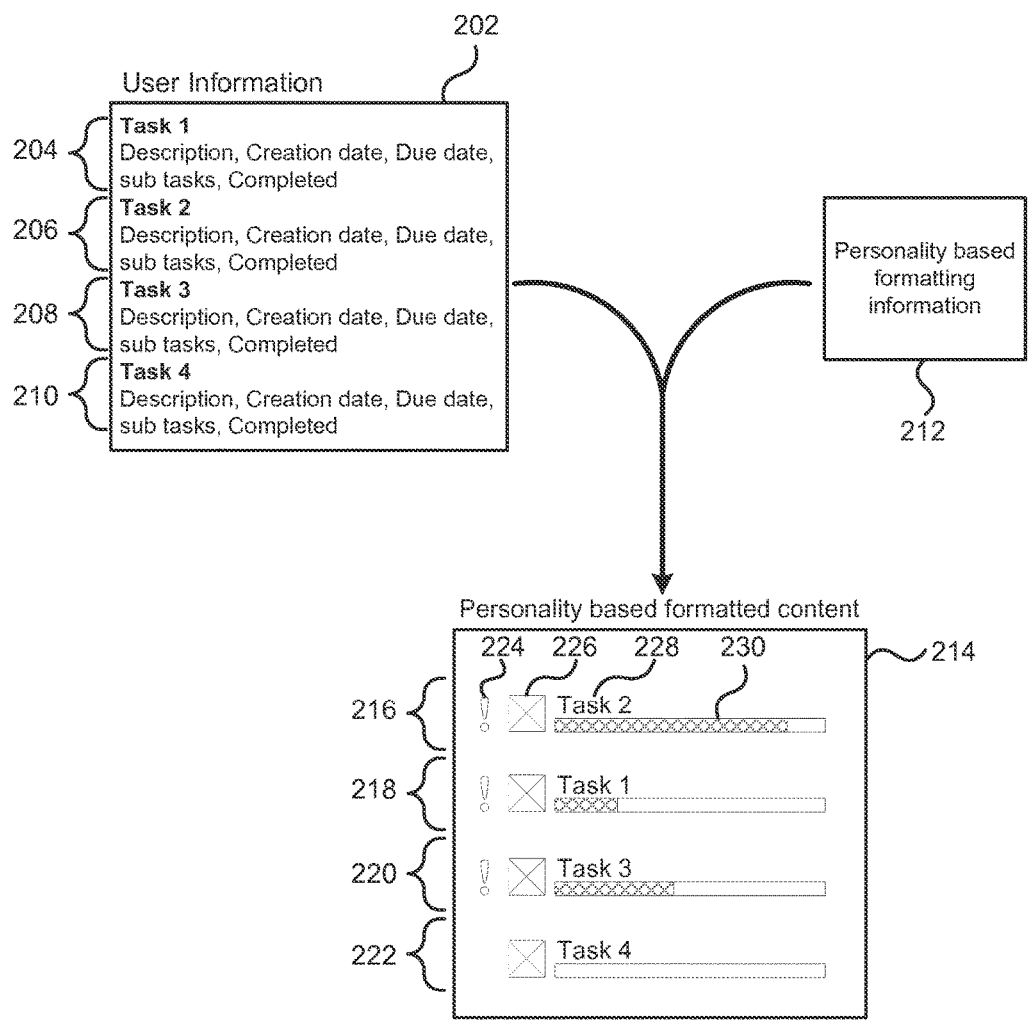
FIG. 2 depicts formatting of information based on personality information.

FIG. 2 depicts formatting of information based on personality information. A user requests information 202. The user information 202 is depicted as a task list. The task list comprises a number of task items 204, 206, 208, 210 for the user. Each task may comprise information such as a task description, creation date, due date, sub tasks to be performed and an amount completed. It will be appreciated that the task information depicted in FIG. 2 is only illustrative, and other types of information may be retrieved and formatted.

The information 202 is formatted according to personality attributes associated with the user that are used to provide personality-based formatting information 212. Using the personality based formatting information 212 the user's associated personality attributes can be used to format the information 202 in a manner well suited for the user's personality. For example, if the user's personality attributes indicate that the user is a visual learner and performs best under pressure, the information 202 may be formatted in order to present information graphically, and order the tasks based on which ones are most urgent.

The information may be formatted using the personality-based formatting information 212 and presented as formatted content 214. The formatted content 214 comprises representations of the tasks 216, 218, 220, 222. Each of the task representations may comprise an icon or graphics 226 associated with the task. The icon 226 may represent a type of the task or present other information in a graphical way. Additionally, the task name or description 228 may be presented along with a visual progress indicator 230 indicative of how much of the task has been completed. The tasks may be ordered based on the date which they are due. Alternatively, the tasks may be ordered based on a weighting of the due date and an amount completed. Additionally, one or more of the tasks may be presented with an icon 224 indicating that the task is urgent or other graphical representation of the information.

The formatted content 214 is only an illustrative example of the possible formatting. The same information could be presented differently to a user with different personality attributes. For example, if the user is not a visual learner, the information may be formatted and presented mainly as text.

Figure 3:
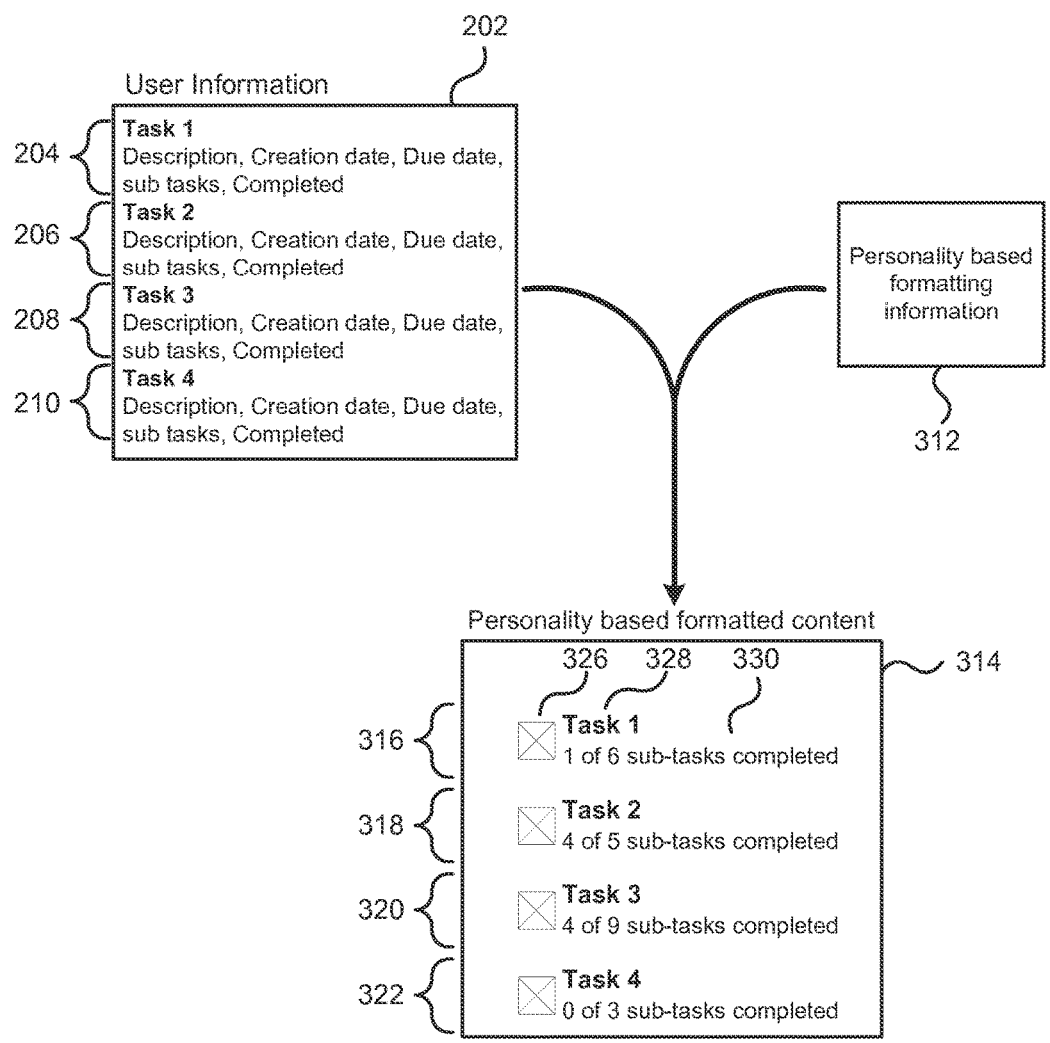
FIG. 3 depicts further formatting of information based on personality information

FIG. 3 depicts further formatting of information based on personality information. In FIG. 3, the user information being formatted is depicted as the same as the user information that was formatted in FIG. 2. However, the personality based formatting information 312 differs from that for formatting the user information in FIG. 2. Accordingly, the personality based formatted content 314 differs. As depicted, the tasks 316, 318, 320, 322 are ordered based on the date of creation of the task. Each task may include an icon 326 associated with the task, as well as the name of the task 328 and an indication of an amount completed of the task 330. As depicted in FIG. 3, the indication of the amount completed 330 is shown as a text describing a number of completed subtasks and a total number of subtasks for the task. In addition to the described formatting and ordering of information, it is possible that the personality information may also be used in determining what information should be depicted. For example, although not depicted in FIG. 2 or FIG. 3, the formatted content could include more details of the task, including for example, other employees assigned to the task, personality information of other employees assigned to the task, descriptions of the task as well as other information.

Figure 4:
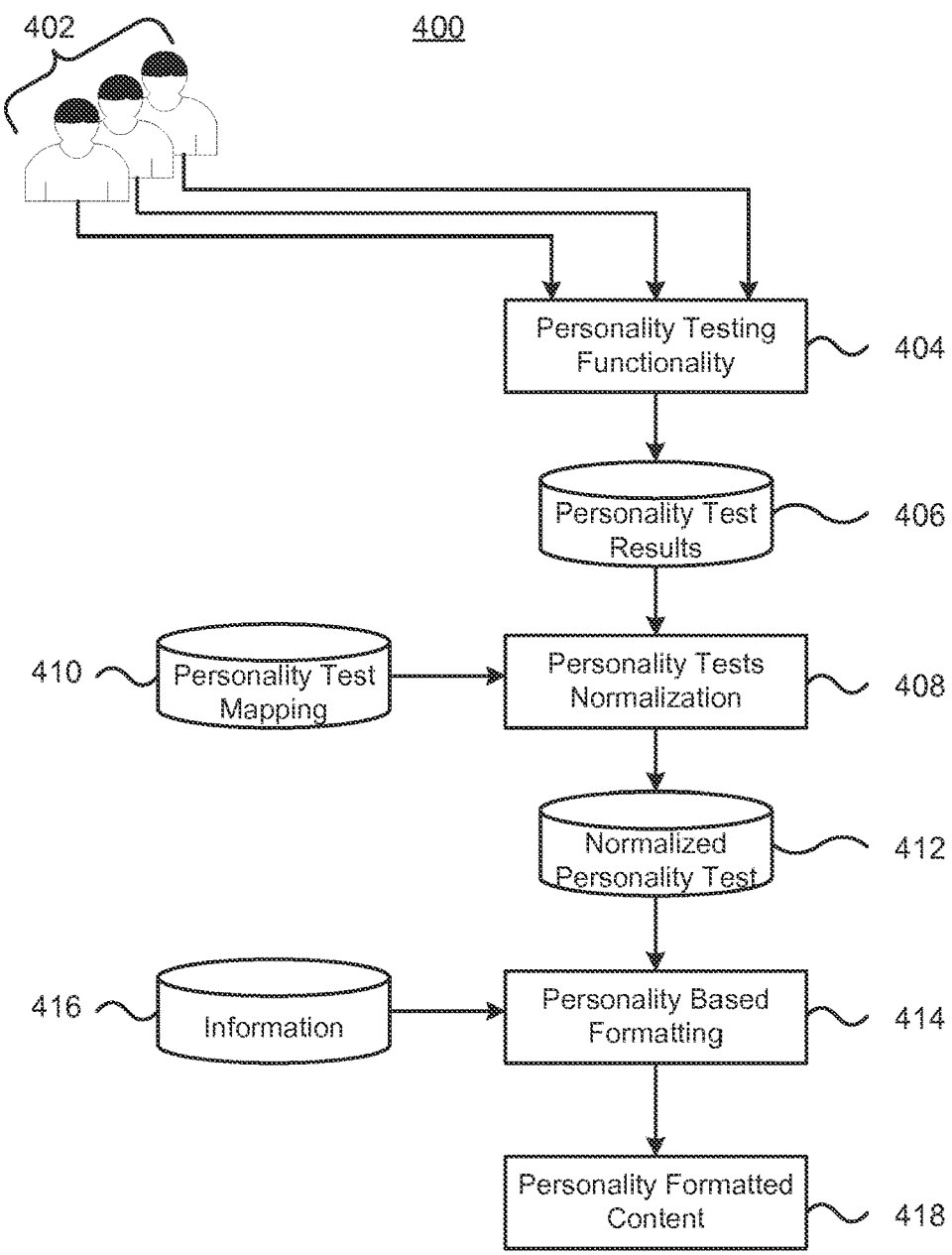
FIG. 4 depicts a process for formatting information based on personality information.

FIG. 4 depicts a process for formatting information based on personality information. The process 400 begins with users 402 taking one or more personality tests. The personality tests may be administered to the users 402 by personality testing functionality 404. The personality testing functionality 404 stores the personality test results 406. Alternatively, the testing results may be inputted manually, or received from other testing functionality, and stored in the testing results database 406. The test results may be from a plurality of different personality tests. A user may take one or more personality tests, the results of which are stored. The personality tests may include for example, Myers Briggs type Indicator™ (MBTI), DiSC™, Newcastle Personality Assessor™ (NPA), Winslow Personality Profile™, Process Communication Model™ (PCM) as well as other personality tests. The personality test results 406 may be processed in order to normalize the results from the various different results. Personality tests normalization functionality 408 may use personality test mappings 410 for mapping the stored test results to common personality attributes. The mapped personality test results can be stored as normalized personality test results 412.

The normalized personality test results 412 may be used by personality based formatting functionality 414 in order to format information 416 for presentation to a user. The information 416 that is received can be formatted and presented to the user as personality-based formatted content 418.

Figure 5:
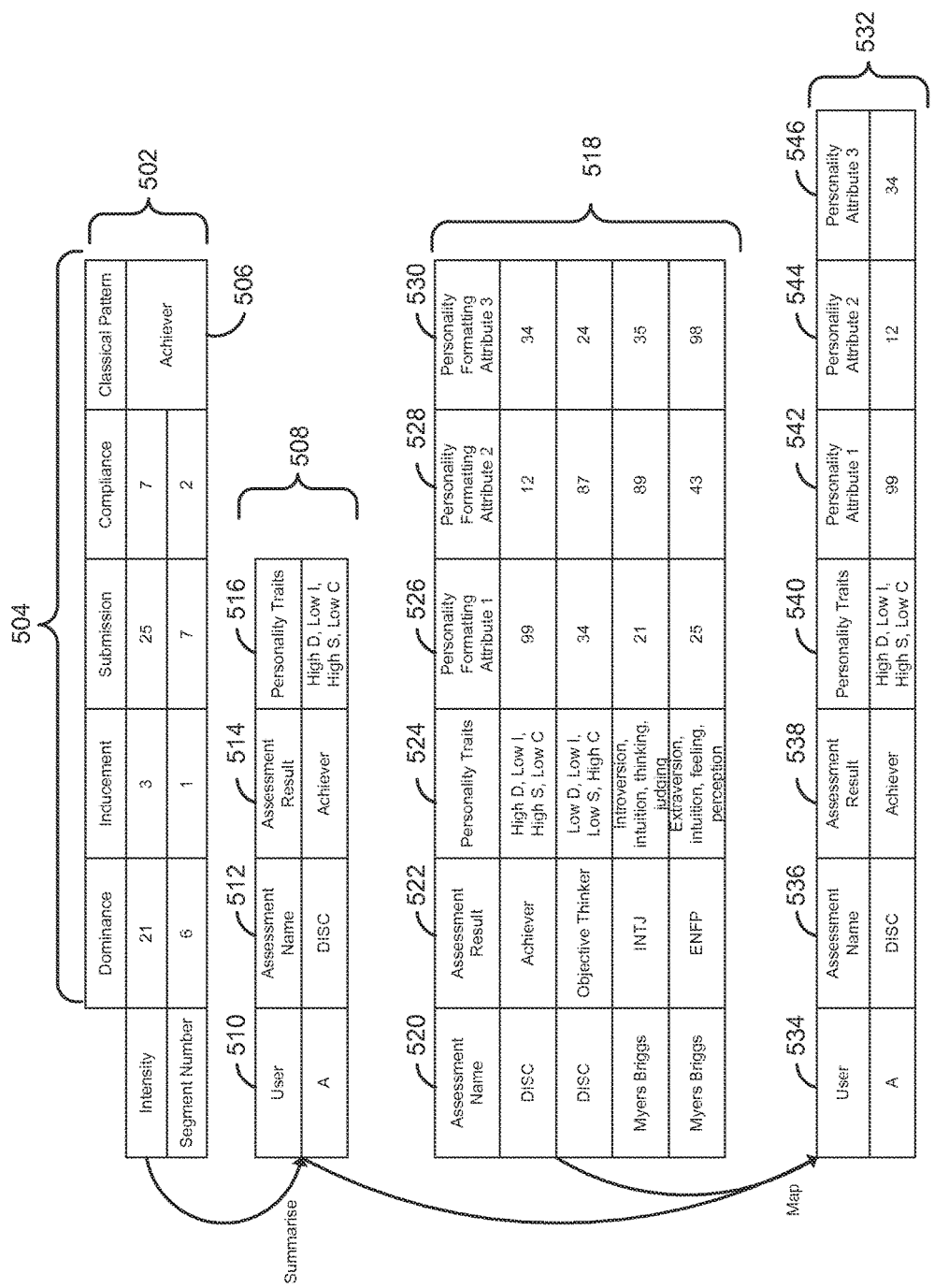
FIG. 5 depicts information used in formatting information based on personality information.

FIG. 5 depicts information used in formatting information based on personality information. Raw results 502 from a users personality test is depicted in FIG. 5. The raw results 502 are depicted as being from a DiSC personality test. As depicted, the test results comprise a plurality of values for different personality traits 504. From the personality traits 504, one or more personality types 506 can be assigned.

The raw personality test results 502 can be summarized and stored in a summary results table 508. The summary result table 508 may store test result summaries for a plurality of users 510. Each result summary may store a test identifier indicating a personality test type 512, a personality type 514 as well as personality traits 516. The summarized results for various tests can be mapped to normalized personality attributes and stored in a normalized table 532. The personality results summary results 508 can be normalized using mapping information 518. The mapping information provides a mapping between test results including the personality types 522 and personality traits 524 for a personality test 520. The mapping 518 provides values for personality attributes 526, 528, 530 for each of the personality test results. The mapping information 518 is used to normalize test results of a user which are stored in the normalized results table 532. The normalized results table 532 may include a user identifier 534; personality test identifier 536, personality type information 538 and personality traits 540 as well as the normalized personality attributes 542, 544, and 546 from the mapping.

As described, the normalized personality attributes may be used in formatting information. The attributes may vary; they may include for example, an indication of a degree to which the user is a visual learner, a degree to which the user performs under pressure, and an indication as to the personal communication style of the user. The values for the personality attributes may be numbers, for example from 1 to 100, or may be a percentage or number from 0 to 1. Depending upon the values of the attributes, information may be formatted for presentation in a manner that suits the user's personality.

As an example of normalization process some of the descriptors associated with a personality type, dependent on the particular personality test, may be identified with an associated value. For example INTJ (introversion, intuition, thinking, judgment) is an initialism used in the publications of the Myers-Briggs Type Indicator (MBTI) to refer to one of the sixteen psychological types may be identified based upon descriptors such as detached, reserved, determined, hard driving, organized and abstract. The descriptors can be associated with personality formatting attributes and provide a mapping between personality types and associated personality attributes. As shown in Table 1 visual, detailed, pressure prompted, social and verbal attributed can be derived from the results of identifying personality type. Each personality type may have different values associated with them for example INTJ versus ENTJ. In addition the mapping may allow for different personality types identified by different personality tests to be mapped to a common baseline. The attribute value may be used to derive preference for a particular type of content or presentation of content. For example a high visual value and a low detail value may indicate the personality responds better to graphics or image presentation, whereas a high detail and high pressure prompted may more readily respond to text descriptions.

TABLE 1

| Personality formatting attribute | INTJ Value | ENTJ Value |
|---|---|---|
| Visual | 70 | 85 |
| Detailed | 50 | 30 |
| Pressure prompted | 30 | 10 |
| Social | 20 | 40 |
| Verbal | 15 | 60 |

The mapping to from the particular personality descriptors for a personality test can be defined as numerical value or a relative indicator (high, medium, low, etc.). A user with a personality assessment can also be provided with an option to 'set formatting preferences' as shown for example in Table 2. The selections may be made by the user and used as a weighting of the determined personality formatting attribute values that have already been defined.

TABLE 2

| | |
|---|---|
| Visual | High ▼ |
| Detailed | Low ▼ |
| Pressure prompted | High ▼ |
| Social | Low ▼ |
| Verbal | Low ▼ |

Table 2 is a simple illustration for users to set attribute values. This can also be represented in a 'wizard' that presents users with different information formats and use their choices to derive the attribute values.

Alternatively, if a user sets their own preferences, their selected preferences may override parameters used to present information. If a user did not set their preference, preference data from other users that have the same personality type. For example, six 'INTJ' users set their preference as shown in Table 3 may be used to modify attribute values in determining presentation of content.

TABLE 3

| Users | Personality Type | Visual Personality Formatting Attribute Preference Rating | Visual Personality Formatting Attribute Preference Score |
|---|---|---|---|
| John Smith | INTJ | High | 100 |
| Paul Ladd | INTJ | High | 100 |
| Todd Sanders | INTJ | High | 100 |
| Joe Beech | INTJ | High | 100 |
| Lisa Manuel | INTJ | Low | 0 |
| Sarah Lipstein | INTJ | High | 100 |

A score can be computed for the attribute by taking the average of the preference ratings. In this case, the computed value for INTJ's visual personality formatting attribute is:

Visual personality formatting attribute [INTJ]=500/6=83

Similarly the rest of the values are calculated if they exist. As more users with personality assessments set their formatting preferences, the system can dynamically calculate the attribute values. Again, these attributes will only be applied to users that have personality assessments but not set their preferences if set values are not applied based upon personality type.

If a user has different assessment types, the assessment type with the lowest standard deviation of scores is selected. For example, suppose a user takes two assessments—Myers Briggs and DiSC, their personality type is 'INTJ' and 'Objective Thinker' respectively. The DiSC visual preference data set is shown for other users rated as an 'Objective Thinker' in Table 4.

TABLE 4

| Users | Personality Type | Visual Personality Formatting Attribute Preference Rating | Visual Personality Formatting Attribute Preference Score |
|---|---|---|---|
| Tom Arnold | Objective Thinker | Low | 0 |
| Paul Ladd | Objective Thinker | High | 100 |
| Todd Sanders | Objective Thinker | High | 100 |
| Ben Gross | Objective Thinker | Low | 0 |
| Pete Leech | Objective Thinker | Low | 0 |
| Lisa Manuel | Objective Thinker | Low | 0 |
| Sarah Lipstein | Objective Thinker | High | 100 |

Based on both data sets, the following can be calculated:

Standard deviation(visual personality formatting preference scores [INTJ])=σ(100,100,100,100,0,100)=40.8

Standard deviation(visual personality formatting preference scores [Objective Thinker])=σ(0,100,100,0,0,0,100)=53.5

In this case, the system selects data set associated the Myers Briggs as it has a lower standard deviation.

Figure 6:
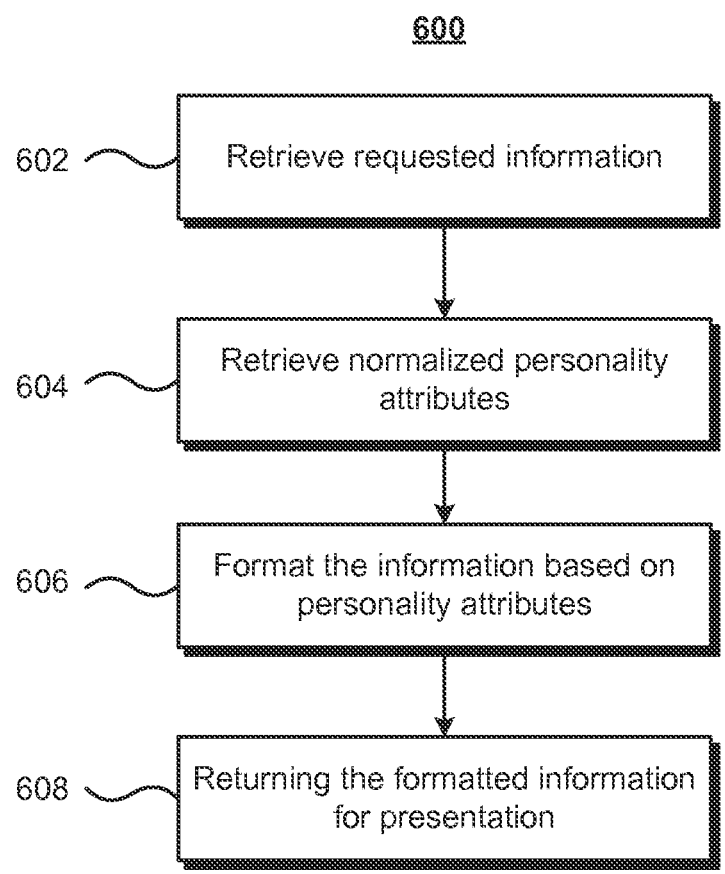
FIG. 6 depicts a method of formatting information based on personality information.

FIG. 6 depicts a method of formatting information based on personality information. The method 600 begins with a user requesting information. For example, a user may request for their current task list to be presented. The request may be associated with a user ID of the user. The method 600 retrieves the information requested by the user (602) and retrieves normalized personality attributes (604) associated with the user, or more particularly the user ID of the user. Once the attributes are retrieved, the retrieved information may be formatted based on the personality attributes (606) and the formatted content returned to the user for presentation to the user (608).

Figure 7:
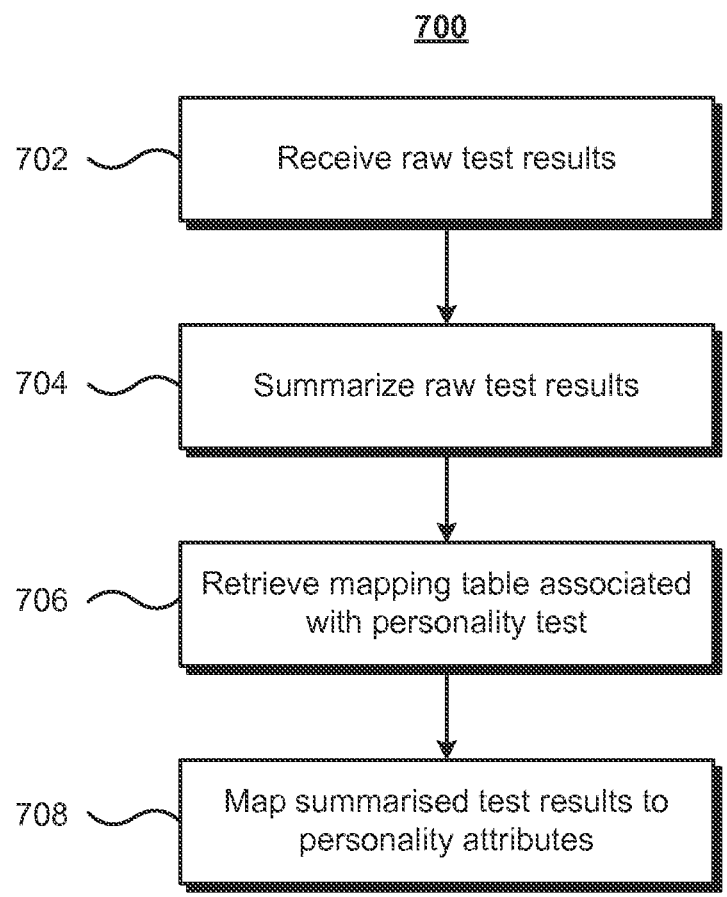
FIG. 7 depicts a method of normalizing personality test results.

FIG. 7 depicts a method of normalizing personality test results. The method 700 begins with receiving raw personality test results (702). The test results include an indication of the user the test is associated with as well as an indication of the test. The raw test results may be summarized into a more compact format and stored (704). A mapping between test results and normalized personality attributes is retrieved (706). The mapping provides values for personality attributes for given personality test results. Once the mapping is retrieved, the summarized test results are mapped to the personality attributes using the mapping information (708).

Figure 8:
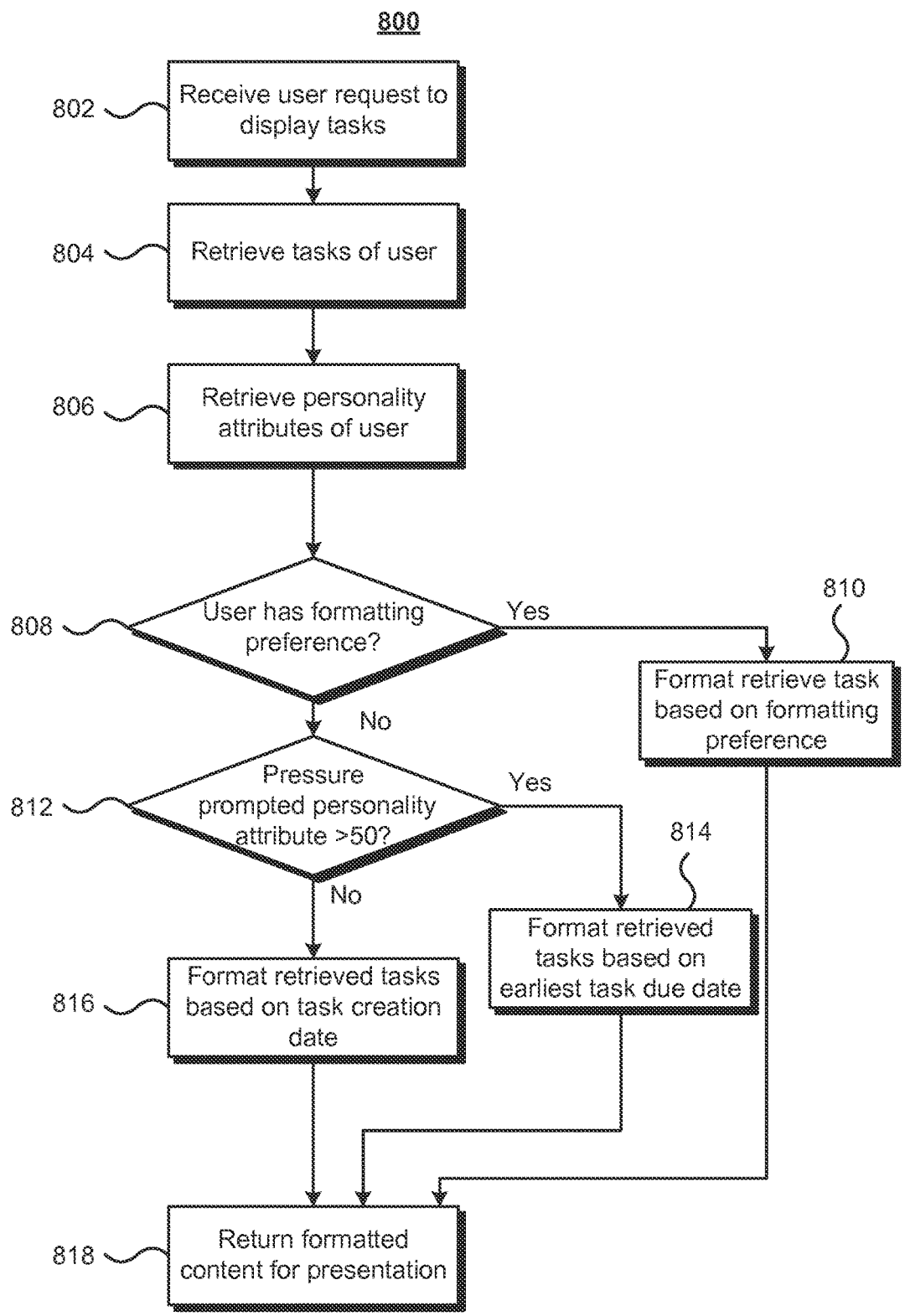
FIG. 8 depicts a further method of formatting information based on personality information.

FIG. 8 depicts a further method of formatting information based on personality information. The method 800 uses personality attributes of a user to format information. The method 800 begins with receiving a user request to present information, such as a task list (802). The information of the user, which in the example of FIG. 8 is a task list for the user, is retrieved (804). Personality attributes associated with the user, or rather the user ID associated with user, are retrieved (806) and used in formatting the retrieved information. It is determined if the user ID is associated with overriding formatting preferences (808). If the user ID is associated with formatting preferences (Yes at 808) the task information is formatted based on the user's formatting preferences (810). If the user ID is not associated with formatting preferences (No at 808), the tasks are formatted based on the personality attributes. It is determined if a pressure prompted personality attribute is greater than a value of 50 (812). If it is greater than 50 (Yes at 812), which may indicate that the user prefers to work on tasks that are the most urgent, the tasks may be ordered based on the earliest task due date (814). If it is not greater than 50 (No at 812), the tasks are ordered based on the task creation date (816). Regardless of how the tasks are formatted, the formatted content is returned to the user's device for presentation (818).

Figure 9:
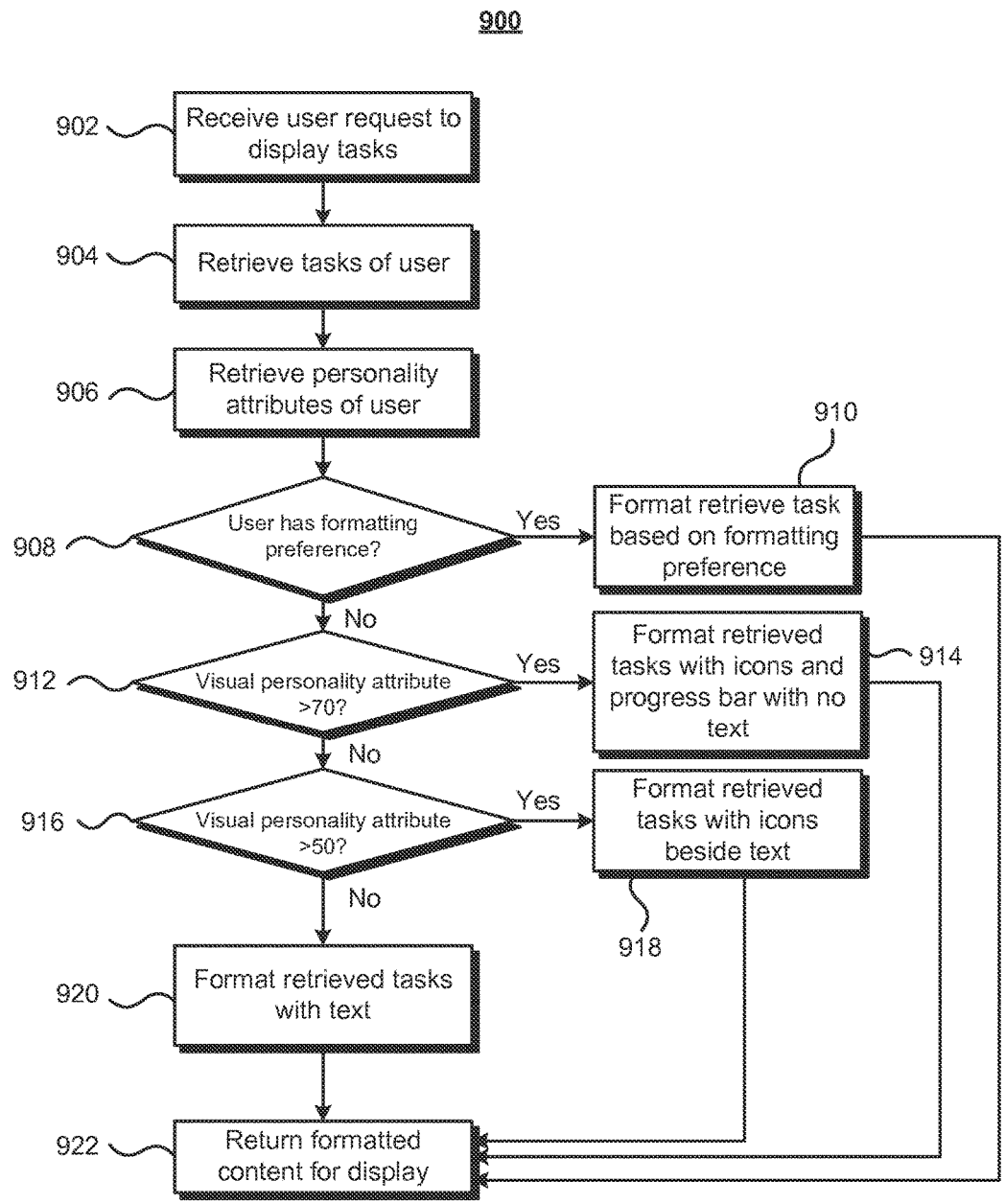
FIG. 9 depicts a further method of formatting information based on personality information.

FIG. 9 depicts a further method of formatting information based on personality information. The method 900 is similar to the method 800; however, the tasks are formatted for their visual appearance as opposed to the order of the information. It is contemplated that the method 900 could be combined with the method 800. The method 900 begins with receiving a user request to present information, such as a task list (902). The information of the user, which in the example of FIG. 9 is a task list for the user, is retrieved (904). Personality attributes associated with the user, or rather the user ID associated with user, are retrieved (906) and used in formatting the retrieved information. It is determined if the user ID is associated with overriding formatting preferences (908). If the user ID is associated with formatting preferences (Yes at 908) the task information is formatted based on the user's formatting preferences (910). If the user ID is not associated with formatting preferences (No at 908), it is determined if a visual personality attribute, which is indicative of a user's preference for viewing information graphically, is greater than about 70 (912). If the value is greater than about 70 (Yes at 912), the tasks are formatted using icons, graphics, progress bars and no, or at least limited, text (914). If the visual personality attribute is not greater than 70 (No at 912), it is determined if the visual personality attribute is greater than 50 (916) and if it is (Yes at 916) the tasks are formatted using icons next to text (918). If the visual personality attribute is not greater than 50 (No at 916) the tasks information is formatted as text (920). Once the tasks have been formatted, regardless of how they are formatted, the formatted content is returned for presentation to the user. Although numeric thresholds have been defined, the thresholds may be varied based upon the attribute and type of object or content that is to be presented or formatted.

Figure 10:
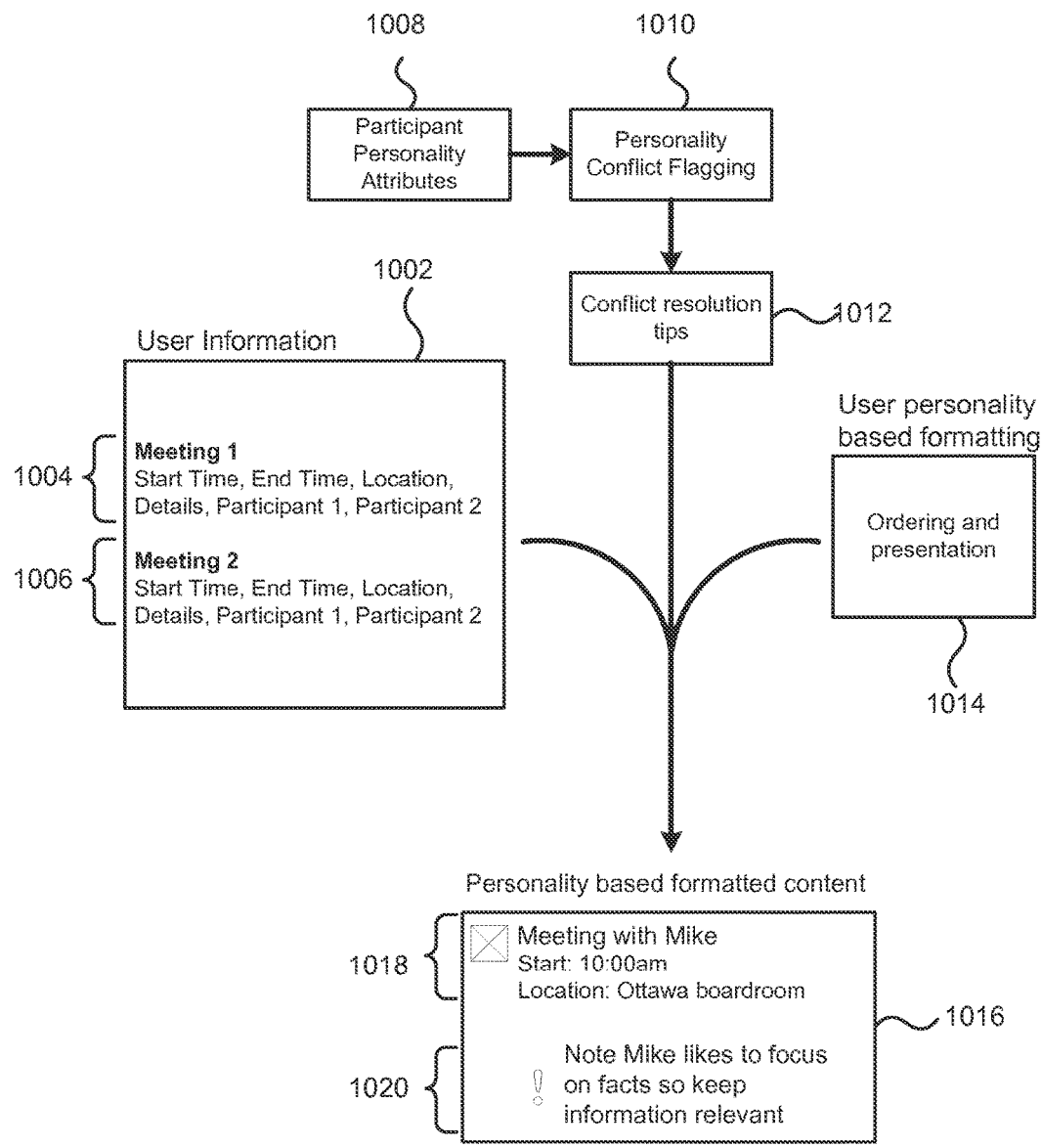
FIG. 10 depicts retrieval and formatting of information based on personality information.

FIG. 10 depicts retrieval and formatting of information based on personality information. The above has described the use of normalized personality attributes generated from personality tests for formatting information to be presented to a user. The personality attributes may also be used in retrieving information to be presented to a user. For example, a user may request meeting information 1002. The meeting information 1002 may provide information on a number of meetings 1004, 1006. The information may include start and end times of the meeting, a location of the meeting, and details for the meeting, as well as participant information which may provide user IDs of meeting participants. The information requested by the user may be processed and the participant information detected. Once the multiple participant information is detected, personality attributes for each participant are retrieved 1008. Once the personality attributes of the participants are retrieved conflicting personality attributes of users can be flagged 1010. If personality conflicts are flagged, conflict resolution tips for resolving or ameliorating the flagged conflicts are retrieved 1012.

The conflict resolution tips 1012 and the meeting information 1002 are formatted according to personality attributes 1014 of the user who requested the meeting information. As depicted, the personality-based formatted information 1016 comprises meeting information 1018 formatted according to the use's personality attributes, as well as the conflict resolution tips 1020, which are also formatted according to the user's personality attributes.

Figure 11:
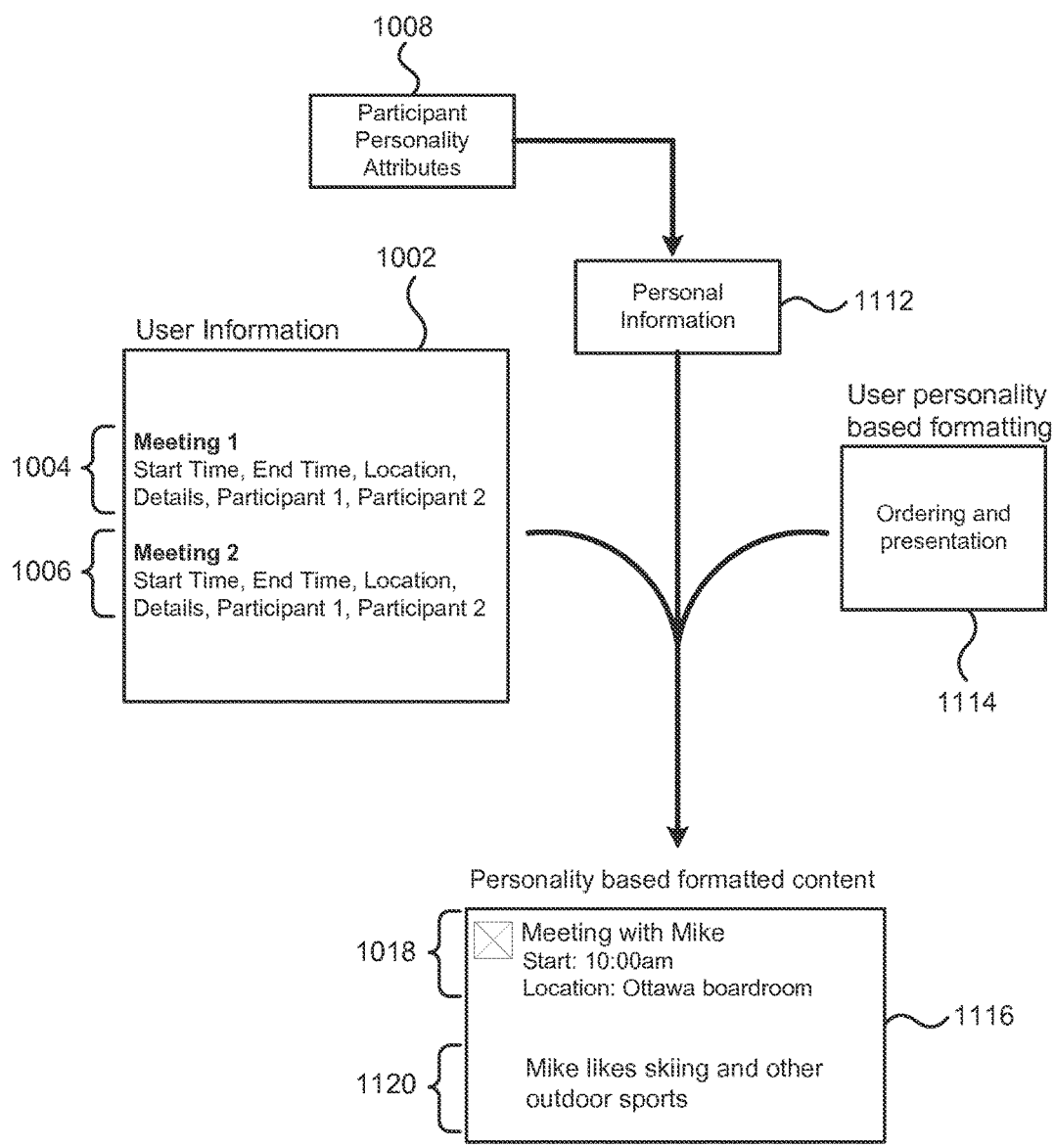
FIG. 11 depicts further retrieval and formatting of information based on personality information.

FIG. 11 depicts further retrieval and formatting of information based on personality information. The user information 1002 is the same as that described above with regard to FIG. 10. However, rather than presenting the user with contact resolution tips as described above, the participants personality attributes 1008 are used to provide personal information 1112 that can be presented to the user. The personal information retrieved and presented to the user may be based on the personality attributes of the user as well as the personality attributes of the participant. As depicted in FIG. 11, the personality based formatted content 1116 includes the meeting information 1016 as well as the personal information 1120, which are depicted as presenting the participant's interests and hobbies.

Figure 12:
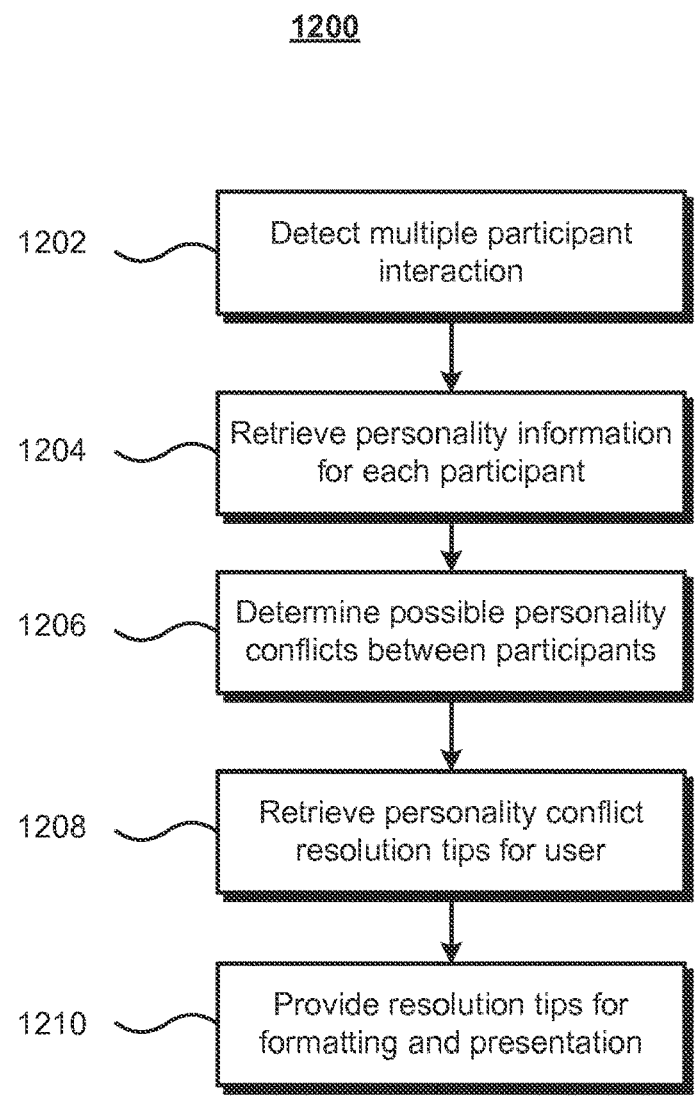
FIG. 12 depicts a method of retrieving information based on personality information.

FIG. 12 depicts a method of retrieving information based on personality information. The method 1200 begins with detecting an interaction between multiple participants (1202). The multiple participant interaction may be detected in the information requested by the user. The user requesting the information may be considered a participant when determining if there are multiple participants involved in an interaction. When an interaction, such as a meeting, between multiple participants is detected, personality information, such as the personality attributes, for each participant of the interaction can be retrieved (1204). With the personality information for the participants retrieved, it is used to determine possible personality conflicts between the participants (1206). When personality conflicts are detected, resolution tips for resolving or dealing with the personality conflicts can be retrieved (1208). Once the resolution tips are retrieved they can be provided for formatting and present with the information requested by the user (1210).

Figure 13:
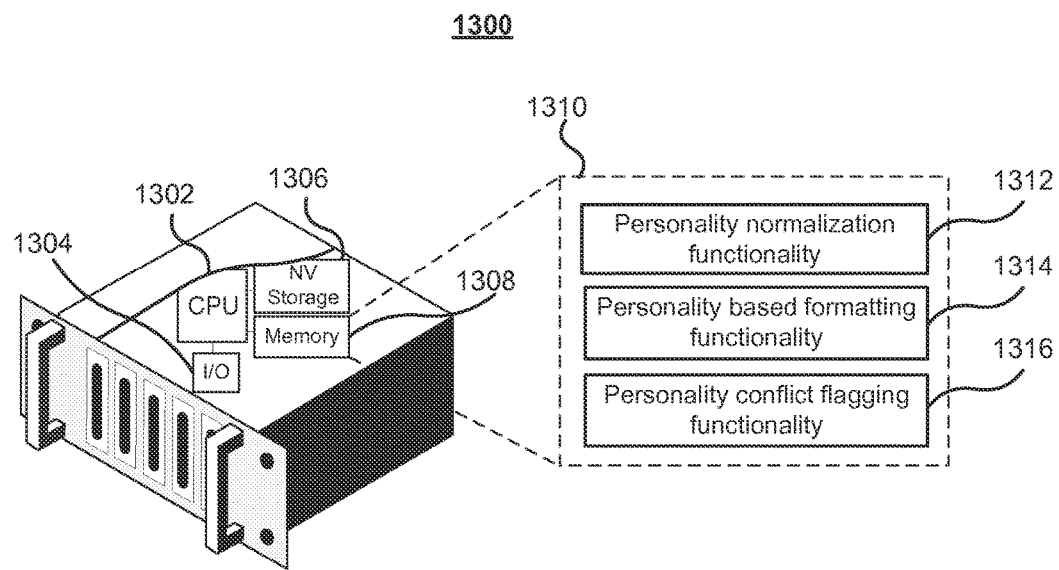
FIG. 13 depicts a networked apparatus for the retrieval and formatting of information based on personality information.

FIG. 13 depicts a networked apparatus for the retrieval and formatting of information based on personality information. The networked apparatus 1300 comprises a central processing unit (CPU) 1302 for executing instructions. A single input/output interface 1304 is depicted, although there may be multiple I/O interfaces. The I/O interface allows the input and/or output of data. Examples of output components may include, for example, display screens, speakers, light emitting diodes (LEDs), as well as communication interfaces for transmitting data over a network or communication channel. Examples of input components may include, for example, capacitive touch screens, keyboards, microphones, mice, pointing devices, camera as well as communication interfaces for receiving data over a network or communication channel.

The server 1300 may further comprise non-volatile (NV) storage 1306 for storing information as well as memory 1308 for storing data and instructions. When the instructions stored in the memory unit 1308 are executed by the processing unit 1302, they configure the networked apparatus to provide various functionality 1310 as described herein. The functionality 1310 may include functionality 1312 for normalizing personality test results in order to provide common personality attributes that can be used in formatting information as well as retrieving information. The functionality 1310 may further include personality based formatting functionality 1314 for formatting information based on normalized personality attributes. The functionality 1310 may further comprise personality conflict flagging functionality 1316 for flagging potential conflicts between participants based on their personality attributes.

Figure 14:
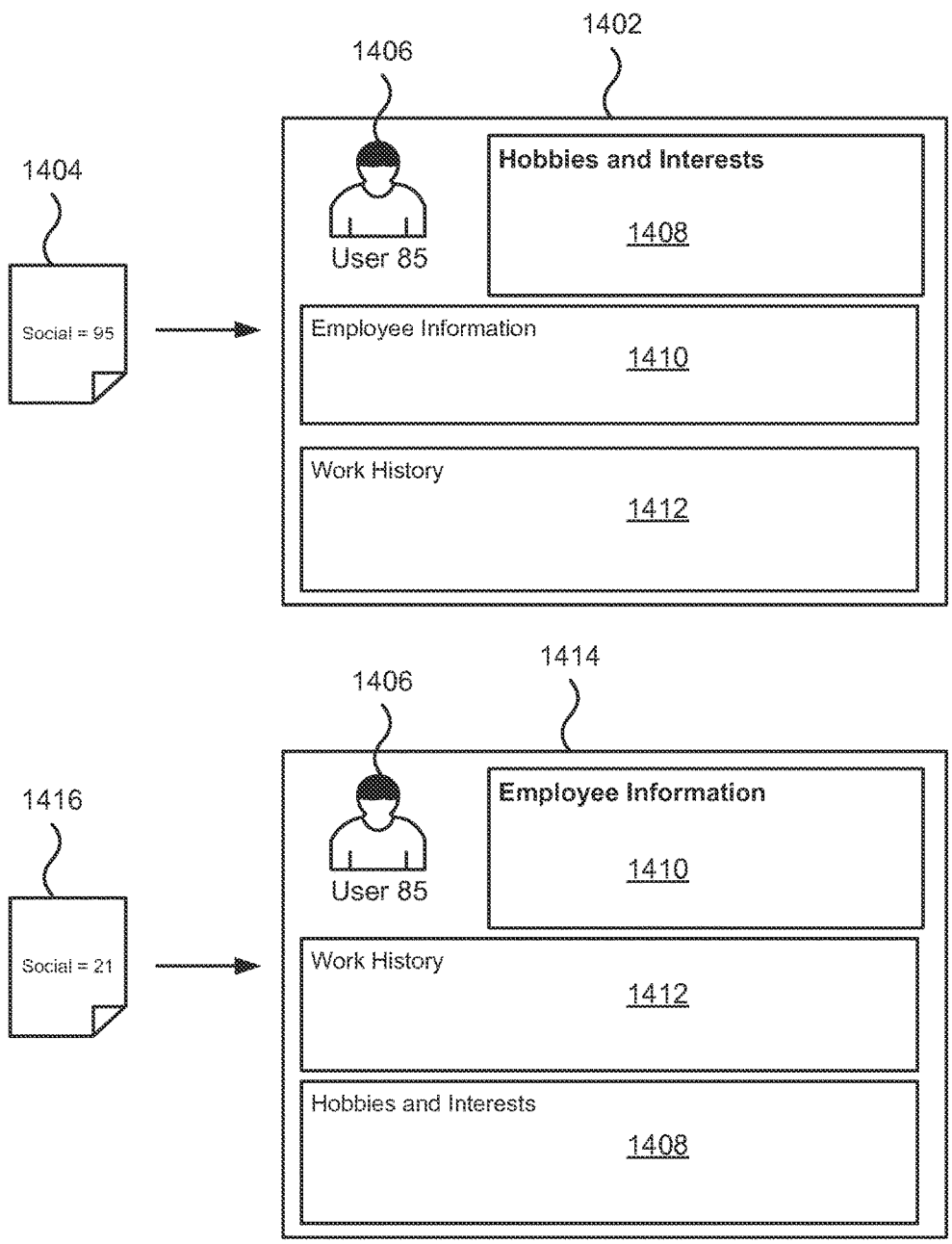
FIG. 14 depicts formatted content based on different personality attributes.

FIG. 14 depicts formatted content based on different personality attributes. As described above, content presented to a user may be formatted based on normalized personality attributes. FIG. 14 depicts an example of adjusting the presentation information based on the personality attributes. In particular, FIG. 14 depicts two differently formatted views 1402, 1414 from the same content. The view 1402 is formatted based on the personality attribute 1404, which is depicted as a social attribute with a value of 95, indicating that the user places a lot of importance on social information. As such, the user profile that is being viewed is formatted in order to present the more social information of the user 85, namely information on the hobbies and interests 1408, in a more prominent location. A user icon or picture, if available may be presented 1406 along with other relevant information such as the employee information 1410 and work history information 1412.

The second view 1414 is formatted based on the same personality attribute, namely a social attribute, however, the value is 21, indicating that the user places less importance on social information. The second view 1414 presents the same information as described above, namely the icon or picture of the employee 1406, the employee's hobbies and interests 1408, the employee information 1410 and work history 1412; however, the information is arranged in a different order. As depicted, the employee information 1410 is presented in a more prominent position with the less important hobbies and interests information in a less prominent position.

Figure 15:
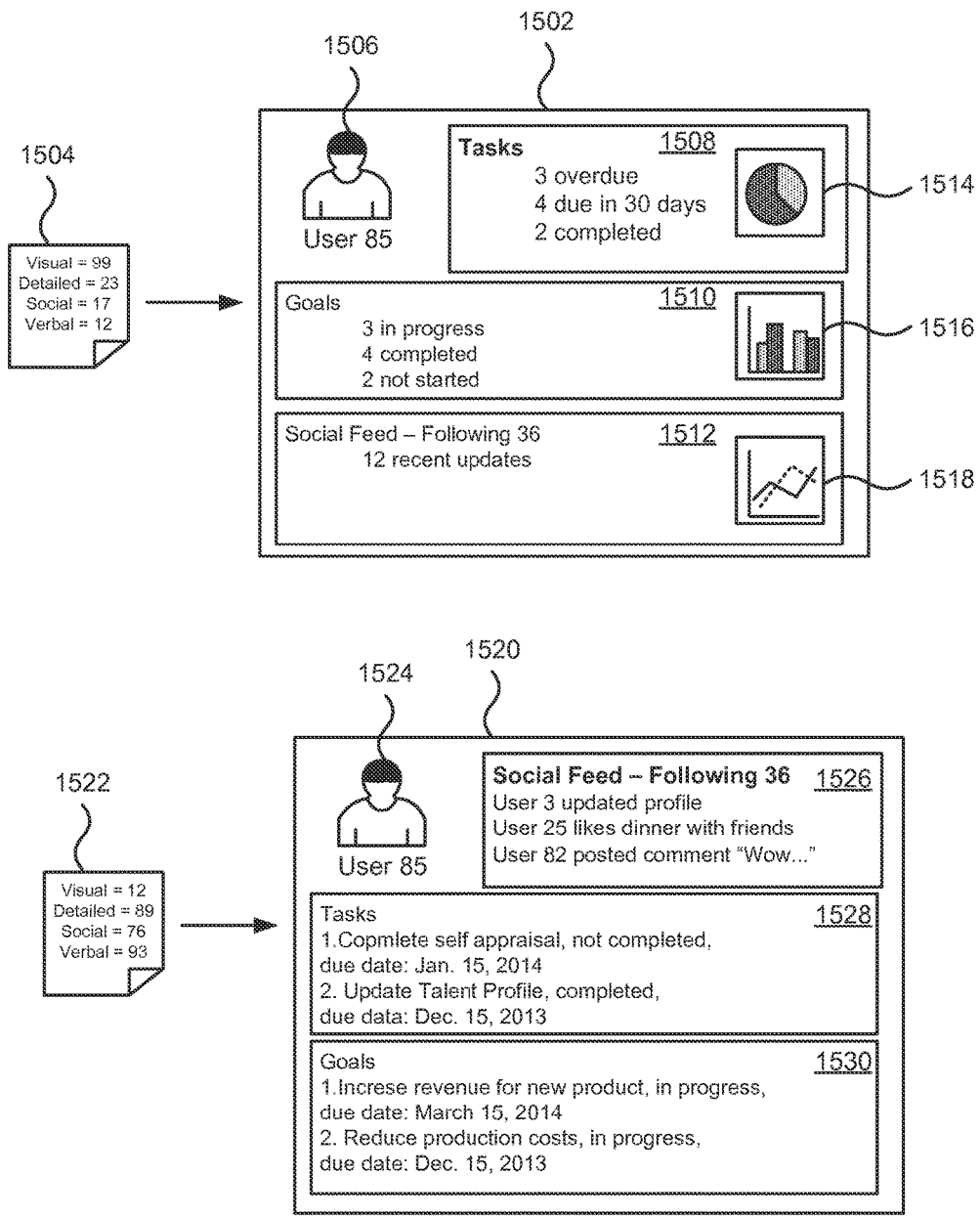
FIG. 15 depicts further formatted content based on different personality attributes.

FIG. 15 depicts further formatted content based on different personality attributes. Similar to FIG. 14, FIG. 15 depicts different formatting of the same content based on different personality attributes. Two different views 1502, 1520 of the content are depicted. The first view 1502 presents an employee icon or picture 1506 and information that is formatted based on the personality attributes 1504, which include a visual attribute with a value of 99, a detailed attribute with a value of 23, a social attribute with a value of 17 and a verbal attribute with a value of 12. The attributes adjust the formatting and information presented. The view 1502 presents the information using summary text and graphics. For example, the tasks 1508 are presented with only a brief summary of the tasks and a graphic 1514 associated with them. Clicking on the graphic 1514 may bring up further information about the tasks. Similarly, the goals 1510 are provided in a brief text form with associated graphic 1516. The social fees information 1512 is also summarized and presented with an associated graphic 1518. In addition to determining an amount of information to present for the various content, the personality attributes 1504 may also be used to order the information for presentation. For example, since the personality attributes indicate that the user is not very social, the social information may be presented last.

In the second view 1520, the employee icon or picture 1506 may be presented along with information formatted based on the personality attributes 1522 that indicate that the user is not a visual person, is detailed and social as well as highly verbal. Accordingly, rather than presenting summarized information and graphics, the view 1520 presents detailed textual information for the social feed 1526, the tasks 1528 and goals 1530. Additionally, since the user places a greater importance on social information, the social feed 1526 may be presented in a prominent location at the top of the view 1520.

Figure 16:
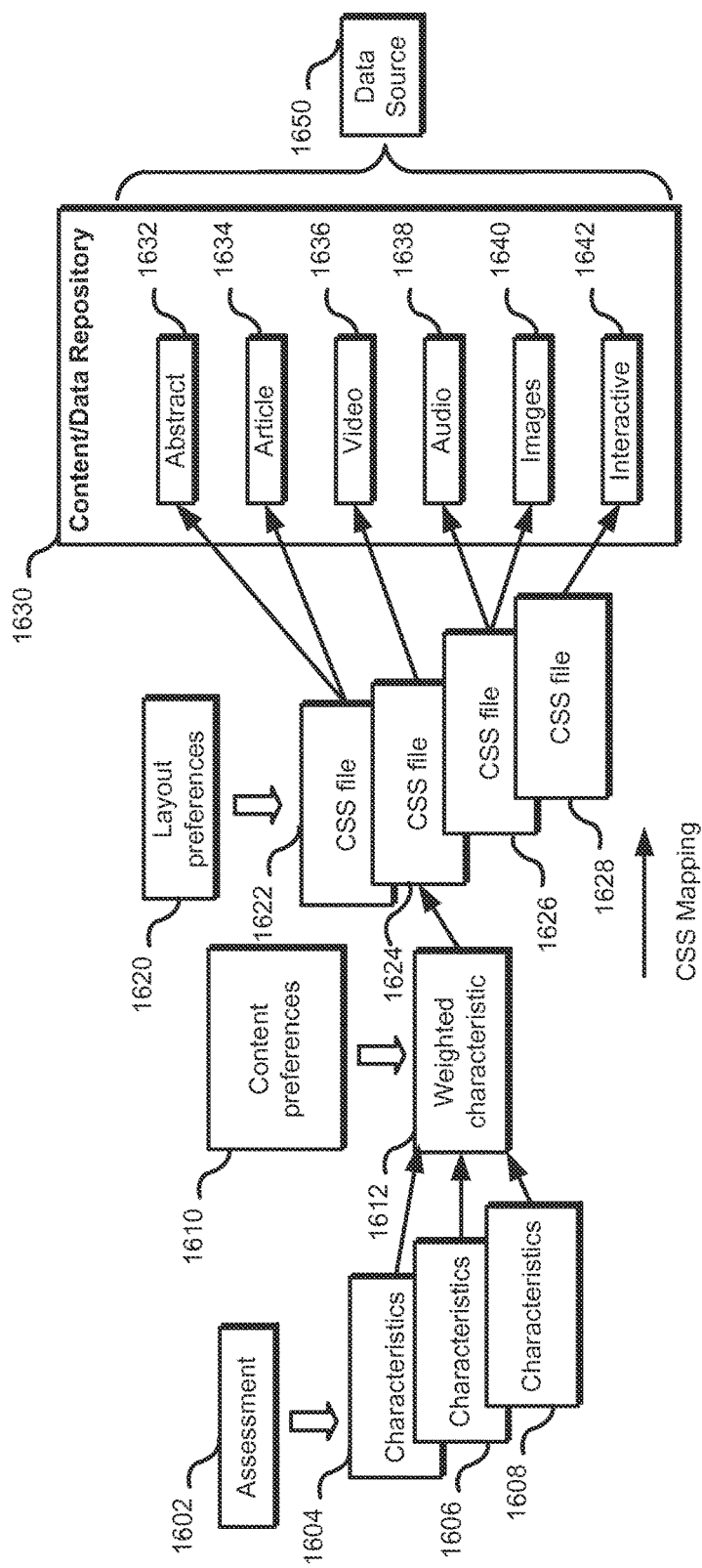
FIG. 16 depicts formatting content based upon personality attributes.

FIG. 16 depicts formatting content based upon personality attributes. The personality assessment test is performed and the results 1602 are generated. From each of the results one or more attributes 1604, 1606 and 1068 are generated having value associated with the personality type. Each attribute may be weighted for the user 1612 using content preferences selected by the user 1610 or by previous system interaction. For example previous user interaction with an interface may be utilized to determine which content the user interacts with which would provide a weighting to the parameters. For example the visual value may be increased if images are more readily selected than a text item. From the weighted values can then be mapped to a format template or definition file, for example one or more Cascading Style Sheets (CSS) 1622 as defined by the World Wide Web Consortium (W3C), 1624, 1626, 1628 may be defined, each associated with attribute weights or a particular personality type. The CSS is a style sheet language used for describing presentation parameters for the look and formatting of a document written in a markup language to define style of web pages and user interfaces written in HTML and XHTML. For a particular value the CSS file 1624 is selected. The CSS may define the amount of text, images, video, audio, positioning, formatting or font that should be utilized. For example on CSS may define all text, another CSS may define text and images where another may define primarily video content be presented. Alternatively, the CSS may define different layouts for the same text content depending on the selected personality attributes. The CSS file can be mapped to particular content or data types provided by a data repository 1630. For example CSS file 1622 is defined for the presentation of text abstracts 1632 and text articles 1634 to a user. CSS file 1624 maps to video 1636 content for an attribute having a high visual component. CSS file 1626 maps to audio 1638 and images 1640 whereas CSS file 1628 maps to interactive content 1642 for presentation. The CSS file may alternative map to the same content but each define different layout for presenting the data/content.

The types of content 1632-1642 may be mapped to a particular subject of data source 1650 for example learning content or news content. The content may also be identified by resource identifiers such as a uniform resource locator (URL) or uniform resource identifier (URI) associated with content stored at another location on the network or external to the system. The content may be based upon conversions of a content item between different formats which may be done automatically or based upon identification of associated content. For example a news article may be provided as radio broadcast recording, a print article, a television news clip, or images. Alternatively there may be conversion between content items, for example a news article may be converted into an audio file, or an audio file may be mapped to images to present video presentation of content using conversion tools such as automated text-to-speech conversion or presentation generation tools. The data source may for example be data repositories for media repositories such as learning material, media content, application data repositories, corporate information repositories, etc. The personality attributes may also define an order of presentation in the CSS or presentation file. As discussed in the in regards to the formatting of content in FIGS. 14 and 15 in addition to the type of information presented the layout and presentation may be defined. The CSS file may define any type of presentation parameters such as for example font, color, size, shape, location or other graphic elements that may be associated with a personality attribute.

Figure 17:
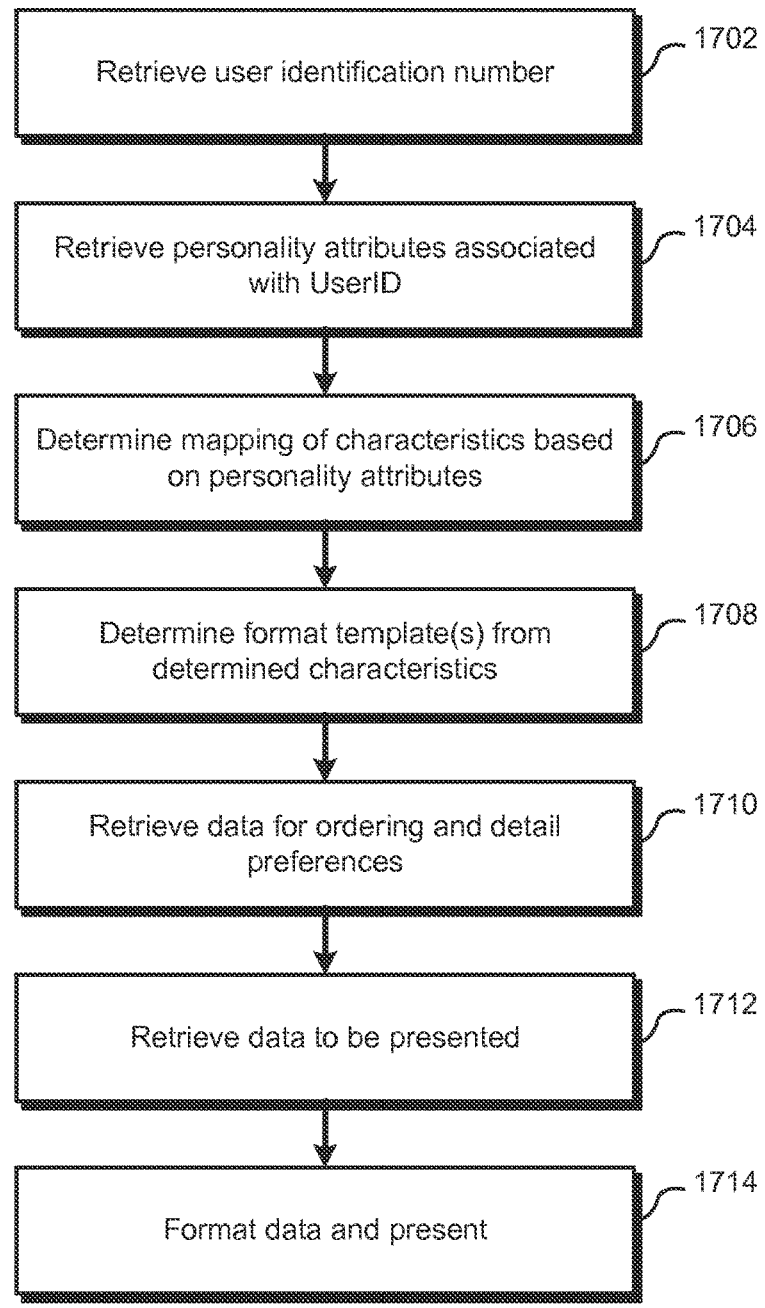
FIG. 17 show a method of formatting content based upon personality attributes.

FIG. 17 show a method of formatting content based upon personality attributes. A user identifier is received (1702) based upon a login user identifier at a computing device. The user identifier may be provided by a domain logon or provided at an application level. Based upon the user personality attributes associated with the identifier can be retrieved (1704). If no attributes are available the user may be prompted to perform a personality assessment. The attributes may need to be retrieved from an external system providing testing and normalization. The attributes may also account for user preferences outside of defined attribute mappings determined by personality testing. The mapping of presentation parameters based upon the retrieved attributes can then be performed (1706). Based upon the determined mapping an associated template, such as a particular CSS file can be determined (1708) and retrieved. The template then identifies parameters for formatting and/or defining types of content, or particular content sources where the applicable content should be retrieved from. Alternatively, the template may identify particular parameters for formatting or conversion of content from a source format to other content formats. The parameters may identify a ranking of positions content associated with objects within the presentation of a page or user interface. The objects may also define order, appearance, font layout or size. The template may configure user interface object blocks where the block can be define relative to the personality attributes. The For example if the source content is text based the template may define parameters for formatting preferences based upon the attributes or may also direct that conversion of content is required. The template may also identify parameters defining levels of detail to be presented from the retrieved content. Additional data may be retrieved based upon user ordering or presentation preferences (1710) which may provide a weighting factor or override the retrieved attributes. The additional data may be used to select the CSS file or may be used to modify the CSS filed already selected. The data/content is retrieved (1712) and formatted for presentation (1714) using the templates and user preferences. The templates may define formatting of content present in web browsers, web applications, office productivity applications, task lists, e-mails, documents, and notifications. The formatting parameters in the template or selection of the template may be further tailored based on the application but may also be associated with parameters such as time or the type of computing device utilized to access the content.

Although the above discloses example methods, apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skills in the art will readily appreciate that the examples provided are not the only way to implement such method and apparatus. For example, the methods may be implemented in one or more pieces of computer hardware, including processors and microprocessors, or other hardware components. A computing device may comprise a processor, memory and display for receiving, sending and processing data for display to a user of the computing device.

The present disclosure has described various systems and methods with regard to one or more embodiments. However, it will be apparent to persons skilled in the art that a number of variations and modifications can be made without departing from the teachings of the present disclosure.

What is claimed is:

1. A method of formatting content for presentation on a display of a computing device, the method comprising:
generating personality attributes for a user of a computing device for use in formatting the content for presentation to the user, the personality attributes being associated with a user identifier (ID) of the user, the generation of the personality attributes comprising:
receiving personality testing information associated with the user ID, the personality testing information including a personality test ID and results of the personality test;
retrieving mapping information for mapping the results of the personality test identified by the personality test ID to normalized personality attributes;
mapping the results of the personality test to the normalized personality attributes using the retrieved mapping;
receiving one or more formatting preferences selected by the user;
modifying the normalized personality attributes based on the one or more formatting preferences to generate the personality attributes associated with the user ID of the user; and
storing the personality attributes in a non-transitory memory;
receiving at the computing device a request to present content associated with the user ID;
retrieving, from the non-transitory memory, the personality attributes associated with the user ID defining personality characteristics of the user associated with the user ID;
retrieving a template based on the retrieved personality attributes, the template defining content presentation parameters in respect of the personality attributes;
formatting content associated with the request using the parameters of the retrieved template; and
presenting the formatted content on the display of the computing device associated with the user ID.

2. The method of claim 1, wherein retrieving the template further comprises determining the template from the personality attributes by mapping a value of the personality attribute to template having an associated value.

3. The method of claim 1 wherein the template is a cascading style sheet (CSS).

4. The method of claim 3 wherein the template is selected from a plurality of templates each template associated with a set of personality attributes.

5. The method of claim 1, wherein the mapping information is generated based on formatting preferences of a group of a plurality of users having common personality attributes.

6. The method of claim 1, wherein the personality attributes define formatting parameters to format content in response to a personality test performed by the user the formatting parameters define one or more of:
how to order tasks;
how to present information as text;
an amount of detail to provide; and
how to present information graphically.

7. The method of claim 1, wherein the request comprises a plurality of user IDs, the method further comprising:
retrieving respective personality attributes associated with each of the plurality of user IDs;
detecting possible personality conflicts between personality attributes;
retrieving conflict resolution tips for any possible personality conflicts;
formatting the conflict resolution tips based on the content formatting parameters; and returning the formatted conflict resolution tips with the formatted content.

8. The method of claim 1, wherein the request comprises a plurality of user IDs, the method further comprising:
retrieving additional content associated with at least one of the plurality of user IDs, the additional content retrieved based on personality attributes associated with the at least one of the plurality of user IDs;
formatting the additional content based on the content formatting parameters; and
returning the formatted additional content with the formatted content.

9. The method of claim 8 wherein the personality attributes comprise one or more of:
a pressure prompted attribute indicative of whether or not a user responds well to pressure of deadlines;
a visual attribute indicative of whether the user prefers information to be presented graphically;
a detailed attribute indicative of whether the user prefers details or summary information;
a logic attribute indicative of the user's preference for logic;
a social attribute indicative of a user's interest in social interactions;
a verbal attribute indicative of a user's preference for verbal communications; and
a contemporary attribute indicative of a user's preference of contemporary interfaces or modern interfaces.

10. The method of claim 1 wherein the request to present content is associated with a content source comprising a plurality of content formats, wherein the template identifies one or more of the plurality of content formats to be presented based upon the retrieved personality attributes.

11. The method of claim 1 wherein the template identifies one or more conversions of content from a first format to a second formation based upon the retrieved personality attributes.

12. The method of claim 1 wherein the personality test results are determined by a personality assessment selected from the group comprising: a Myers Briggs type Indicator™ (MBTI), a DiSC™ profile, a Newcastle Personality Assessor™ (NPA), a Winslow Personality Profile™, and a Process Communication Model™ (PCM).

13. A non-transitory computer readable memory containing instructions for formatting content for presentation on a display of a computing device, the instructions which when executed by a processor of the computing device performing:
generating personality attributes for a user of a computing device for use in formatting the content for presentation to the user, the personality attributes being associated with a user identifier (ID) of the user, the generation of the personality attributes comprising:
receiving personality testing information associated with the user ID, the personality testing information including a personality test ID and results of the personality test;
retrieving mapping information for mapping the results of the personality test identified by the personality test ID to normalized personality attributes;
mapping the results of the personality test to the normalized personality attributes using the retrieved mapping;
receiving one or more formatting preferences selected by the user;
modifying the normalized personality attributes based on the one or more formatting preferences to generate the personality attributes associated with the user ID of the user; and
storing the personality attributes in memory;
receiving at the computing device a request to present content associated with the user ID;
retrieving, from the memory, personality attributes associated with the user ID defining personality characteristics of the user associated with the user ID;
retrieving a template based on the retrieved personality attributes, the template defining content presentation parameters in respect of the personality attributes;
formatting content associated with the request using the parameters of the retrieved template; and
presenting the formatted content on the display of the computing device associated with the user ID.

14. The non-transitory computer readable memory of claim 13, wherein retrieving the template further comprises determining the template from the personality attributes by mapping a value of the personality attribute to template having an associated value.

15. The non-transitory computer readable memory of claim 14 wherein the template is a cascading style sheet (CSS).

16. The non-transitory computer readable memory of claim 15 wherein the template is selected from a plurality of templates each template associated with a set of personality attributes.

17. The non-transitory computer readable memory of claim 13, wherein the mapping information is generated based on formatting preferences of a group of a plurality of users having common personality attributes.

18. The non-transitory computer readable memory of claim 13, wherein the personality attributes define formatting parameters to format content in response to a personality test performed by the user the formatting parameters define one or more of:
how to order tasks;
how to present information as text;
an amount of detail to provide; and
how to present information graphically.

19. The non-transitory computer readable memory of claim 13, wherein the request comprises a plurality of user IDs, the method further comprising:
retrieving respective personality attributes associated with each of the plurality of user IDs;
detecting possible personality conflicts between personality attributes;
retrieving conflict resolution tips for any possible personality conflicts;
formatting the conflict resolution tips based on the content formatting parameters; and
returning the formatted conflict resolution tips with the formatted content.

20. The non-transitory computer readable memory of claim 13, wherein the request comprises a plurality of user IDs, the method further comprising:
retrieving additional content associated with at least one of the plurality of user IDs, the additional content retrieved based on personality attributes associated with the at least one of the plurality of user IDs;
formatting the additional content based on the content formatting parameters; and
returning the formatted additional content with the formatted content.

21. The non-transitory computer readable memory of claim 20 wherein the personality attributes comprise one or more of:
- a pressure prompted attribute indicative of whether or not a user responds well to pressure of deadlines;
- a visual attribute indicative of whether the user prefers information to be presented graphically;
- a detailed attribute indicative of whether the user prefers details or summary information;
- a logic attribute indicative of the user's preference for logic;
- a social attribute indicative of a user's interest in social interactions;
- a verbal attribute indicative of a user's preference for verbal communications; and
- a contemporary attribute indicative of a user's preference of contemporary interfaces or modern interfaces.

22. The non-transitory computer readable memory of claim 13 wherein the request to present content is associated with a content source comprising a plurality of content formats, wherein the template identifies one or more of the plurality of content formats to be presented based upon the retrieved personality attributes.

23. The non-transitory computer readable memory of claim 13 wherein the template identifies one or more conversions of content from a first format to a second formation based upon the retrieved personality attributes.

24. The non-transitory computer readable memory of claim 13 wherein the personality test results are determined by a personality assessment selected from the group comprising: a Myers Briggs type Indicator™ (MBTI), a DiSC™ profile, a Newcastle Personality Assessor™ (NPA), a Winslow Personality Profile™, and a Process Communication Model™ (PCM).

* * * * *